(12) United States Patent
Drumheller et al.

(10) Patent No.: US 12,469,171 B2
(45) Date of Patent: Nov. 11, 2025

(54) DYNAMICALLY CALIBRATING ONE OR MORE INDUSTRIAL LINE CAMERAS SIMULTANEOUSLY WITH A CALIBRATION TARGET, PACKAGES, AND RUNNING TRANSPORT

(71) Applicant: Datalogic USA, Inc., Eugene, OR (US)

(72) Inventors: Jason Drumheller, Reading, PA (US); Bradley Gruss, Harleysville, PA (US)

(73) Assignee: Datalogic USA, Inc., Eugene, OR (US)

( * ) Notice: Subject to any disclaimer, the term of this patent is extended or adjusted under 35 U.S.C. 154(b) by 416 days.

(21) Appl. No.: 17/956,670

(22) Filed: Sep. 29, 2022

(65) Prior Publication Data

US 2023/0099417 A1    Mar. 30, 2023

Related U.S. Application Data

(60) Provisional application No. 63/250,047, filed on Sep. 29, 2021.

(51) Int. Cl.
*G06T 7/80* (2017.01)
*G01B 11/00* (2006.01)
*G06T 7/292* (2017.01)

(52) U.S. Cl.
CPC .............. *G06T 7/80* (2017.01); *G01B 11/002* (2013.01); *G06T 7/292* (2017.01)

(58) Field of Classification Search
None
See application file for complete search history.

(56) References Cited

U.S. PATENT DOCUMENTS

| | | |
|---|---|---|
| 5,550,362 A | 8/1996 | Sherman |
| 5,825,483 A | 10/1998 | Michael et al. |
| 6,798,925 B1 | 9/2004 | Wagman |
| 7,385,743 B2 | 6/2008 | Gagliano et al. |
| 8,360,318 B2 | 1/2013 | Reynolds et al. |
| 8,872,911 B1 | 10/2014 | Wallack et al. |
| 9,007,368 B2 | 4/2015 | Laffargue et al. |
| 9,047,519 B2 | 6/2015 | Schuler et al. |
| 9,230,326 B1 | 1/2016 | Lin |
| 9,247,218 B2 | 1/2016 | Saporetti |
| 9,268,979 B2 | 2/2016 | Thompson et al. |

(Continued)

OTHER PUBLICATIONS

Su, Daobilige et al., "Improved Cross-Ration Invariant-Based Intrinsic Calibration of a Hyperspectral Line-Scan Camera", Sensors 2018; Jun. 8, 2018, 22 pages.

*Primary Examiner* — Andrew H Lam
(74) *Attorney, Agent, or Firm* — Foley & Lardner LLP

(57) ABSTRACT

A dynamic dimensioning system includes at least one camera, a range finder, and a tachometer. A computer may be used to perform a dynamic calibration operation for the cameras coupled over a communications network. The dynamic calibration operation includes a calibration estimate routine configured to generate default configuration parameters selected by a user from among a plurality of pre-defined user inputs via a graphical user interface, and a calibration refinement routine configured to refine the default configuration parameters to generate a completed set of calibration parameters that are set for the at least one camera. The dynamic calibration operation may be performed without first performing any static calibration operation.

20 Claims, 7 Drawing Sheets

(56) References Cited

U.S. PATENT DOCUMENTS

| | | |
|---|---|---|
| 9,519,810 B2 | 12/2016 | Gao et al. |
| 9,749,621 B2 | 8/2017 | Lin et al. |
| 9,818,197 B2 | 11/2017 | Viti et al. |
| 10,066,982 B2 | 9/2018 | Ackley |
| 10,161,742 B2 | 12/2018 | Patel et al. |
| 10,321,127 B2 | 6/2019 | Laffargue et al. |
| 10,643,349 B2 | 5/2020 | Beinschob |
| 10,699,091 B2 | 6/2020 | Gagliano |
| 10,909,708 B2 | 2/2021 | Ackley et al. |
| 2011/0075156 A1* | 3/2011 | Patel .................. G01B 11/0691 356/603 |
| 2017/0032537 A1 | 2/2017 | Li et al. |
| 2023/0086050 A1* | 3/2023 | Feldman .................. G06T 7/80 382/154 |

* cited by examiner

DYNAMICALLY CALIBRATING ONE OR MORE INDUSTRIAL LINE CAMERAS SIMULTANEOUSLY WITH A CALIBRATION TARGET, PACKAGES, AND RUNNING TRANSPORT

RELATED APPLICATIONS

This application claims the benefit of U.S. Provisional Application No. 63/250,047, filed Sep. 29, 2021, and entitled DYNAMICALLY CALIBRATING ONE OR MORE INDUSTRIAL LINE CAMERAS SIMULTANEOUSLY WITH A CALIBRATION TARGET, PACKAGES, AND RUNNING TRANSPORT, the disclosure of which is incorporated by reference herein in its entirety.

TECHNICAL FIELD

The present disclosure relates generally to scanners or code readers, and more particularly, to calibration of industrial line scan cameras.

BACKGROUND

Industrial line scan cameras and related systems used for various transportation and logistics applications, such as courier, express, parcel and e-commerce, etc. Calibration of such line scan camera systems has conventionally been performed by first mounting the camera in an exact position and orientation using manual positioning devices (e.g., levels, angles, etc.). Once the cameras were mounted, a computer was connected to each individual camera and the camera was calibrated through an extensive programming routine and visual orientation by the technician setting up the tunnel. Such conventional calibration techniques require a skilled technician to participate in every tunnel set-up, which is time consuming and expensive. Other calibration methods have included a combination of static and dynamic calibration routines using one or more calibration boxes that are placed within a scanning tunnel. The static calibration routine allows for a lower skilled tunnel operator or technician to set-up and calibrate the system and establish the system's operating region of interest for both the rangefinder and the cameras. During the dynamic calibration, calibration boxes are passed through the system (e.g., on a conveyor) and the dynamic calibration is configured to fine tune the position attributes that were measured during static calibration by using barcodes found on the calibration boxes. Such calibration methods also require some form of manual measurements of distances during the static calibration routine that can be time consuming and introduce errors as it is performed for each camera within the system. The inventors have appreciated a need for further improvements to such calibration methods.

BRIEF SUMMARY

A dynamic dimensioning system is configured to scan one or more objects moving on a transport mechanism. The system comprises at least one camera having a field-of-view directed toward the transport mechanism; a range finder operably coupled with the at least one camera over a communications network; a tachometer operably coupled with the at least one camera over the communications network; and a computer operably coupled to the communications network. The computer is configured to perform a dynamic calibration operation comprising: a calibration estimate routine configured to generate default configuration parameters responsive to selections by a user from among a plurality of pre-defined user inputs via graphical user interface; and a calibration refinement routine configured to refine the default configuration parameters to generate a completed set of calibration parameters that are set for the at least one camera.

A method for dynamically configuring one or more industrial line camera with a calibration target on a transport mechanism. The method comprises arranging at least one camera having a field-of-view directed toward the transport mechanism; performing, via a computer, a dynamic calibration operation without first performing any static calibration operation. The dynamic calibration operation comprises generating default configuration parameters via a calibration estimate routine responsive to selections by a user from among a plurality of pre-defined user inputs via graphical user interface; refining the default configuration parameters to generate a completed set of calibration parameters via a calibration refinement routine; and applying the refined configuration parameters to the at least one camera for subsequent operation.

DETAILED DESCRIPTION

Figure 1:
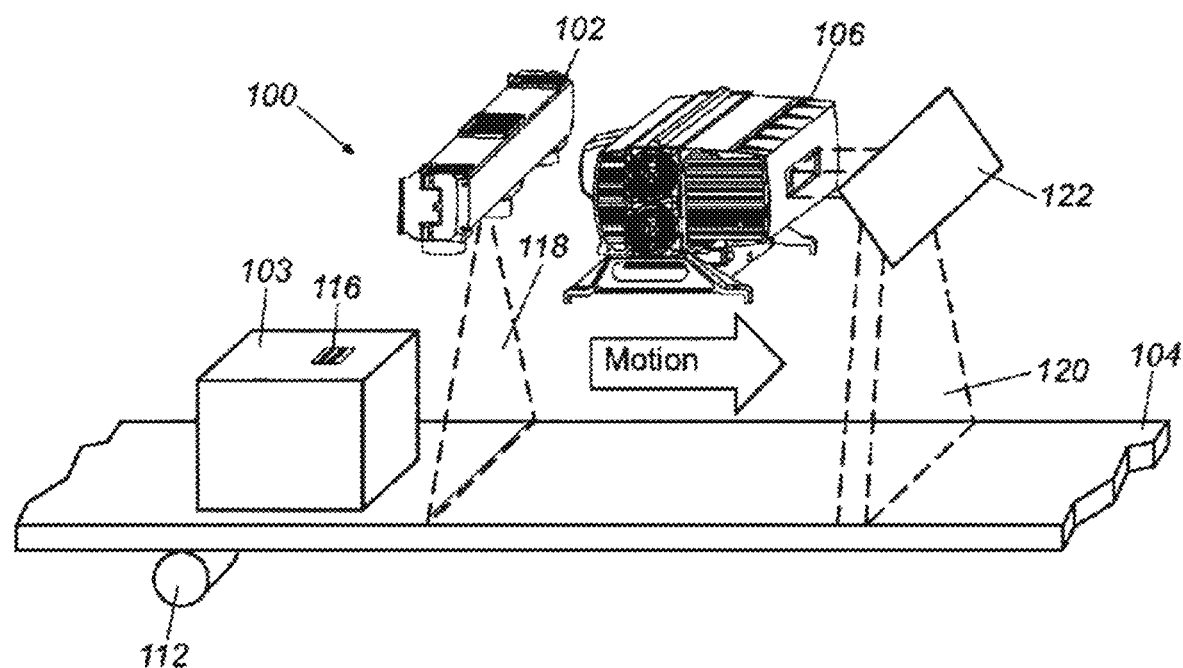
FIG. 1 is a schematic representation of a dynamic dimensioning system according to embodiments of the disclosure.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

Embodiments of the disclosure may include a system and method for calibrating an industrial line scanner including a moveable surface, one or more cameras, and a dimensioning device. Orientations of the dimensioning device and camera are estimated. Instances of a calibration object on the moveable surface are acquired by the dimensioning device and the camera, and a relationship is defined between the two devices. A calibration object is moved along the moveable surface through the devices' fields of view, controlling the camera's focal distance according to the relationship, so that the dimensioning device and the camera acquire instances of the calibration object, and the relationship is revised.

Different configurations and details regarding the construction and components of an industrial line scanner and related system are contemplated. For example, additional features and configurations of devices and systems are described in the following patents and patent applications: U.S. Pat. No. 8,360,318, issued Jan. 29, 2013, and entitled "DIMENSIONING AND BARCODE READING SYSTEM," U.S. Pat. No. 10,699,091, issued Jun. 30, 2020, entitled "REGION OF INTEREST LOCATION AND SELECTIVE IMAGE COMPRESSION," U.S. Pat. No. 9,818,197, issued Nov. 14, 2017, entitled "SYSTEM AND METHOD FOR READING MACHINE READABLE CODES IN TRANSPORTATION AND LOGISTIC APPLICATIONS," U.S. Pat. No. 10,161,742, issued Dec. 25, 2018, entitled "RANGE FINDER," U.S. Pat. No. 7,385,743, issued Jun. 10, 2008, entitled "LINEAR IMAGER RESCALING METHOD," and U.S. Pat. No. 9,247,218, issued Jan. 26, 2016, entitled "METHOD FOR IMAGE ACQUISITION," the disclosure of each of which is incorporated by reference in their entirety.

FIG. 1 is a dynamic dimensioning system 100 according to an embodiment of the disclosure. The dynamic dimensioning system 100 is configured to scan one or more objects 103 moving on a transport mechanism 104. The transport mechanism 104 may include a conveyor belt, a cross belt sorter, a tilt tray, or other similar device configured to move objects from one location to another.

The dynamic dimensioning system 100 may include a camera 106 and range finder 102. An example of such a camera is the AV7000 linear camera available from Datalogic S.p.A. of Bologna, Italy. The dynamic dimensioning system 100 may include additional cameras (see, e.g., FIG. 2). It should be understood that the camera 106 may be mounted to direct its field-of-view 120 directly onto transport mechanism 104, or the field-of-view may be redirected by a mirror 122. Redirecting the field-of-view allows the camera 106 to be positioned so that its scanning image is parallel to y-axis, where the mirror 122 redirects the field-of-view along z-axis. The object 103 may include an indicia 116 (e.g., barcode) which may be decoded by the dynamic dimensioning system 100. The results of the decoding and/or the image data may also be transmitted to a host system (not shown) for further processing.

In operation, objects 103 are moved through a field-of-view 118 of range finder 102. The range finder 102 detects the presence of object 103 and determines the range, extent and orientation of the object with respect to the transport 104. The extents of object 103 refer to the left and right edges of the object along x-axis. The range finder 102 generates an object start trigger that notifies the cameras 106 (only one of which is shown in FIG. 1; see also cameras 108, 110 of FIG. 2) of the presence of the object 103 as well as an object end signal. The range finder 102 transmits height and extent data to cameras 106, which use the information to focus its optics to maximize the efficiency and effectiveness of detecting and reading barcode 116.

Figure 2:
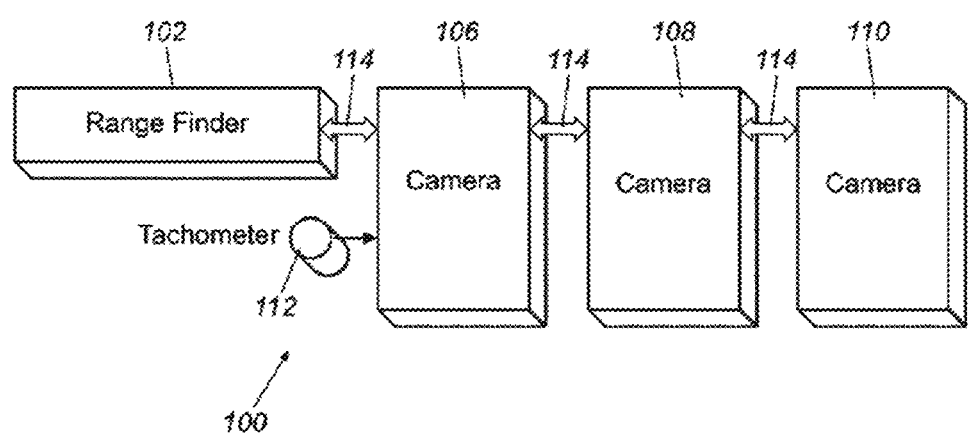
FIG. 2 is a block diagram of a dynamic dimensioning system according to embodiments of the disclosure.

As shown in FIG. 2, the dynamic dimensioning system 100 may include a plurality of cameras 106, 108 and 110 operably coupled with each other and with the rangefinder 102. The rangefinder 102 may be used to determine the height and rough dimensions of the object 103 as it is transported. The rangefinder 102 may include a time-of-flight (TOF) sensor and/or other dimensioning devices (e.g., a dimensioner, light curtains, etc.). A combination of range finding devices may be used. For example, a dimensioner may be configured to provide a height, left, and right measurements. A light curtain may be configured to provide a height measurement. A time-of-flight (TOF) sensor may be configured to provide height, left, and right measurements. A combination of such devices may be used to obtain one or more dimensions of an object moving on the transport mechanism.

The dynamic dimensioning system 100 may also include one or more tachometers 112 coupled with the cameras 106, 108, 110. The tachometer 112 may be configured to measure the speed of the moving transport mechanism 104, and output a signal representative of the movement of the transport mechanism 104. The tachometer data may be used to track the motion of object 103 through a field-of-view of the cameras 106, 108, 110. The tachometer 112 may produce a "tach count" as a sample within an industrial line camera. For example, the tach count may increment each time a sample is received (e.g., rising edge) by the tachometer. Thus, the tach count may be indicative of a fixed number of rising edge samples per inch. The tachometer may also produce a "tach stamp" event which may be a tach count when a particular event occurred.

The rangefinder 104 the cameras 106, 108, 110, and the tachometer 112 may be networked together by through a wireless and/or wired communications network 114, such as for example, an Ethernet connection. The communications network 114 may be referred to as a synchronization (sync) network, because it may include an inter-camera network (e.g., Ethernet) with distributed tachometer count signals among the cameras. In other words, the cameras 106, 108, 110 on the sync network may share the same tach count. While only three cameras are shown in FIG. 2, it should be understood that any number of cameras can be networked together to form a scanning tunnel.

Each camera 106, 108, 110 processes the video data stream and locates and decodes any barcode data present on the object by detecting light reflected from the object 103 being scanned. Once the object 103 reaches a predetermined distance (e.g., downstream from tunnel system or other point set by the host), the dynamic dimensioning system 100 transmits the barcode data to the host system for further processing. Additional details regarding elements of the camera and other features of an exemplary dynamic dimensioning system are described in U.S. Pat. No. 8,360,318, which is incorporated herein by reference in its entirety as mentioned above. Additional features of the dynamic dimensioning system may be further provided as described below.

Figure 3:
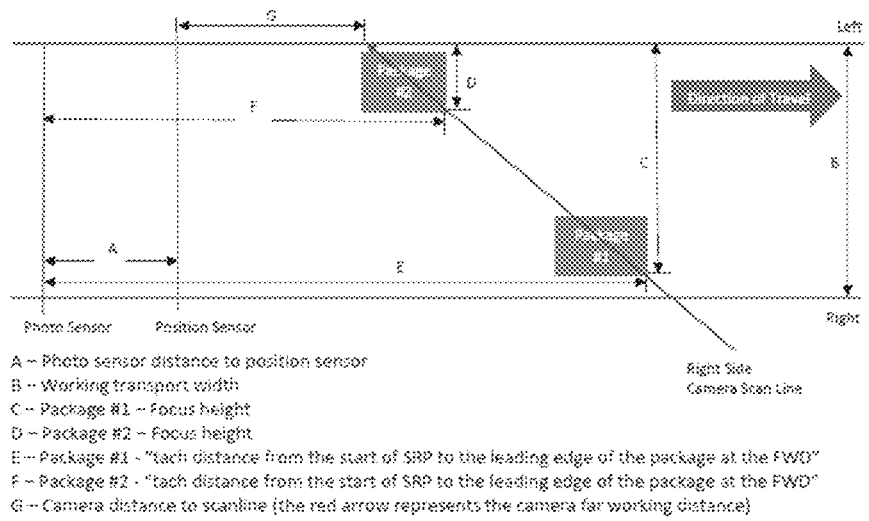
FIG. 3 shows an arrangement of a transport mechanism showing different measurement values that may be helpful in understanding the operation of embodiments of the disclosure for one or more objects moving along the transport mechanism in a direction of travel.

FIG. 3 shows an arrangement of a transport mechanism showing different measurement values that may be helpful in understanding the operation of embodiments of the disclosure for one or more objects (e.g., packages 1, 2) moving along the transport mechanism in a direction of travel indicated by the labeled arrow in FIG. 3. The system may include a photo sensor and a position sensor separated by a distance A as shown in FIG. 3. Additional distances are shown in FIG. 3 that are used in the description below, including a working transport width (B), a focus height (C, D), tach distances (E, F), and a camera distance to the scanline (G).

The photo sensor may be configured to generate an active high signal (e.g., TTL) or an active low signal (e.g., TTL) to indicate a package is present. When the photo sensor transitions from unblocked to blocked, the start of photo sensor is tach stamped and multicast over the sync network to all cameras. When the photo sensor transition from blocked to unblocked, the end of photo sensor is tach stamped and multicast over the sync network to all cameras.

The position sensor may be configured to generate package position information at a predefined time interval. The data received is tach stamped and multicast over the sync network to all cameras.

The focus height (C, D) may be a value that is measured differently for each camera position:
 a. Top focus height—Distance from the top of the package to the conveyor surface.
 b. Left focus height—Distance from the right side of the package to the left side of the conveyor. This is the particular arrangement of the focus height shown in FIG. 3.
 c. Right focus height—Distance from the left side of the package to the right side of the conveyor.

The working transport width (B) is the distance between the left and right sides of the transport mechanism where the camera will be expected to read barcodes. The working transport width (B) may not necessarily be the same as the physical width of the transport.

The camera "distance to scanline" (G) is the distance from the system reference point to the camera scanline at the cameras far working distance.

Tach distances (E, F) may be defined for each package from the start of the system reference point to the leading edge of the package at the far working distance. The far working distance (FWD) may be the maximum working distance from the camera. The system reference point (SRP) may be determined by a photo Eye and/or a position sensor to indicate the start and end of a package.

An image valid start is the image line where the package breaks the camera scanline. Image valid end is the image line where the package leaves the camera scanline. Incorrect calibration parameters will cause image valid to be generated at the wrong tach count. Resulting in either the leading, trailing, or entire package being lost.

Each camera may capture the following capture events:
 a. Logged (example—info.log):
  i. Tach stamped start and end of the photo sensor
  ii. Tach stamped start and end of the position sensor
  iii. Tach stamped package position data from the position sensor
  iv. Tach stamped start and end of image valid
  v. Tach stamped decode results
 b. Stored in memory (example—TODO with new target):
  i. All the image lines received from the start of photo sensor or position sensor to the end of the image buffer
  ii. All the image lines received from the start of photo sensor or position sensor to the end of the image buffer As described briefly above, embodiments of the disclosure include calibration of an industrial line scanner that is configured to be fully calibrate the cameras with dynamic calibration without the need for static calibration. A computer (not shown) may be connected to the communications network 114 for the user to interact with a user interface to perform the calibration of the cameras 106. The user may input information into a user interface to begin the calibration process without the need for manual measurement steps required by a static calibration routine. As a result, an estimate phase and an automatic measurement (or refining) phase is described herein that eliminates the need for manual measurements of previous methods.

During the estimate phase, the user inputs specific information about the application which is then used by the system to generate estimated calibration parameters for each camera. The estimated calibration parameters may include determining a far working distance for each camera based on one or more of a camera mounting angle (or mirror mounting angle), camera position, minimum camera range, maximum camera range, lens focal plane adjustment, lens size, sensor pitch, and sensor size. Certain parameters such as the camera mounting angle, mirror mounting angle, and/or camera position may be selected by a user from among a set of pre-defined estimates as discussed below. Certain parameters such as the minimum camera range, maximum camera range, lens focal plane adjustment, lens size, sensor pitch, and sensor size may be retrieved (e.g., read) from a file stored in camera memory during factory calibration. The estimated calibration parameters accurate enough for the system to be able to locate the calibration target during the dynamic phase.

During the automatic measurement phase, different size objects with our targets on them may enable calibrating all the cameras in the system simultaneously. The automatic measurement phase also relies on distributed tach counts to measure the distances between the trigger source, position sensor, and the location of the target. Those distances are compared to the actual camera tracking values that are tach stamped and embedded in each scanline of the rolling image buffer (the actual camera tracking values are embedded based on the cameras current calibration parameters). When those distances match within a predetermined tolerance threshold, the camera is determined to be properly calibrated. The user can calibrate all the cameras at the same time by selecting which the camera(s) are desired for calibration (e.g., all, some, or one).

Figure 4:
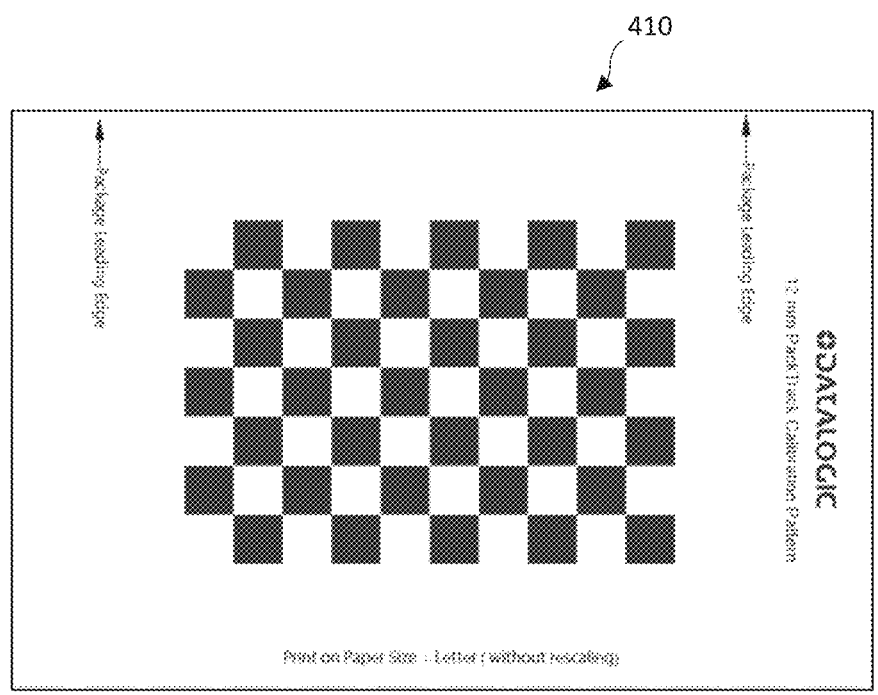
FIGS. 4 and 5 show an example of a package setup for calibration of an industrial line scan system according to an embodiment of the disclosure.
Figure 5:
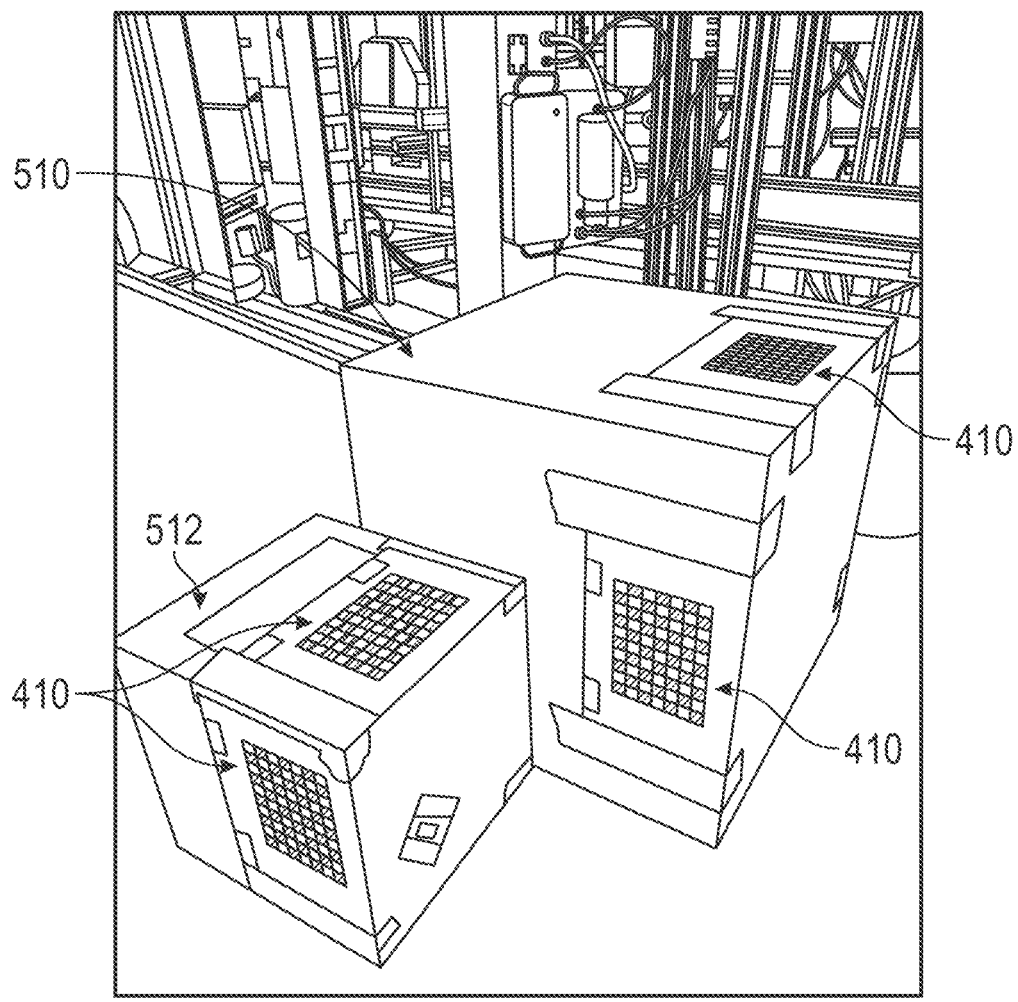

FIGS. 4 and 5 show an example of a package setup for calibration of an industrial line scan system according to an embodiment of the disclosure. In particular, FIG. 4 shows a calibration target 410 that, in FIG. 5, is disposed at one or more locations on a package 510, 520. As shown in FIG. 5, a plurality of packages 510, 512 having different heights may be used for calibration, and each package 510, 512 may have multiple calibration targets 410 disposed thereon at different locations. For example, a calibration target 410 may be disposed on the top, left, right, and bottom surfaces of each package 510, 512 to be used for calibration. Depending on the arrangement and number of cameras in a particular system, some surfaces may not require a calibration target 410. For example, a top calibration target may not be needed if a top camera is not being calibrated. Left and right calibration targets may not be needed if left and right side cameras are not being calibrated. A bottom target may not be needed if a bottom camera is not being calibrated.

Figure 6:
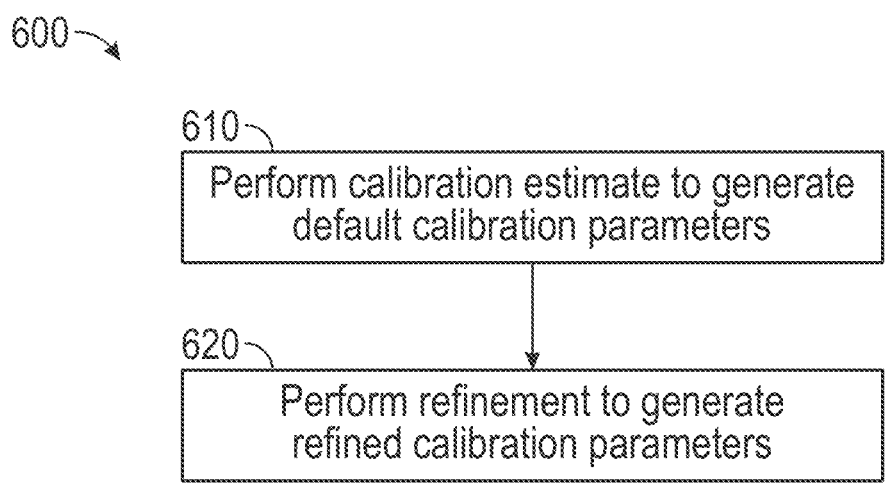
FIG. 6 is a flowchart illustrating a method for calibrating an industrial line scan system according to an embodiment of the disclosure.

FIG. 6 is a flowchart 600 illustrating a method for calibrating an industrial line scan system according to an embodiment of the disclosure. At operation 610, a calibration estimate is generated by the system. The calibration estimate may determine estimate parameters (also referred to as "default parameters" or "default calibration parameters"). The estimated parameters may set the camera default calibration parameters close enough to find the calibration target in the captured image. At operation 620, the system may refine the default calibration parameters to generate a completed set of calibration parameters (also referred to herein as "refined calibration parameters") through a dynamic calibration process involving one or more packages moving on the transport mechanism.

Calibration Estimate

Referring again to the calibration estimate, this may be accomplished by:
 a. Receiving, through a user interface, a maximum package height that is application specific for the system to be calibrated.
 b. Determining the working transport width. This may be performed by extracting the working transport width from the position sensor or receiving the working transport width through an input to the user interface from the user.
 c. Allowing the user to select the cameras to calibrate, along with the mounting position and mirror mounting angle of each selected camera (See FIG. 3).
 d. Calculating the far working distance needed to cover the required field-of-view using the information collected (e.g., maximum package height, working transport width, mounting position and angle) along with the lens and sensor size for each camera being calibrated. The lens and sensor size may be retrieved automatically from camera memory by the calibration system. The field-of-view may be determined by the conveyor width for Top and Bottom cameras and the maximum package height/conveyor width for Left and Right cameras. The required field-of-view may be based on the working transport width and the maximum package height. This enables the cameras to capture the images during the calibration estimate process to be in focus so that the calibration target can be identified.

To determine the starting far working distance based on the conveyor width and maximum package height, the following parameters may be utilized:
 a. SR=Starting Camera Range (e.g., in millimeters (mm))
 b. MinR=Minimum Camera Range (e.g., in mm read from factory calibration file)
 c. MaxR=Maximum Camera Range (e.g., in mm read from factory calibration file)
 d. R=Range (e.g., in mm)
 e. LFPA=Lens Focal Plane Adjustment (e.g., read from factory calibration file)
 f. LS=Lens Size (e.g., read from factory calibration file)
 g. SP=Sensor Pitch (e.g., read from factory calibration file)
 h. FOV=Field-of-View (e.g., in mm)
 i. SS=Sensor Size
 j. MA=Mirror Angle (e.g., selected by the user when dynamic calibration is started)
 k. NR=Near range (e.g., range value that satisfies the required FOV at the near)
 l. OH=maximum package height (top/bottom) or conveyor width (left/right)
 m. OR=Calculated range of the maximum object size (maximum package height (top/bottom) or conveyor width (left/right))

Starting at MinR and ending at MaxR, the FOV may be calculated for each range until the FOV matches the coverage needed for the given conveyor width (Top/Bottom) or maximum package height (Left/Right).
 a. FOV=((SS/DPI)*25.4), where
 b. DPI=(25.4/((((R−LFPA)/LS)−1)*SP))

A range is found that satisfies the FOV required to arrive at the determined near range (NR). The calculated range (OR) may then be calculated using the starting MA (15, 30, or 45) and the OH.
 a. OR=((1/cos(MA))*OH)

The starting camera range (SR) may then be determined from the near range (NR) satisfying the FOV requirement and the calculated range (OR).
 a. SR=(OR+NR)

Figure 7:
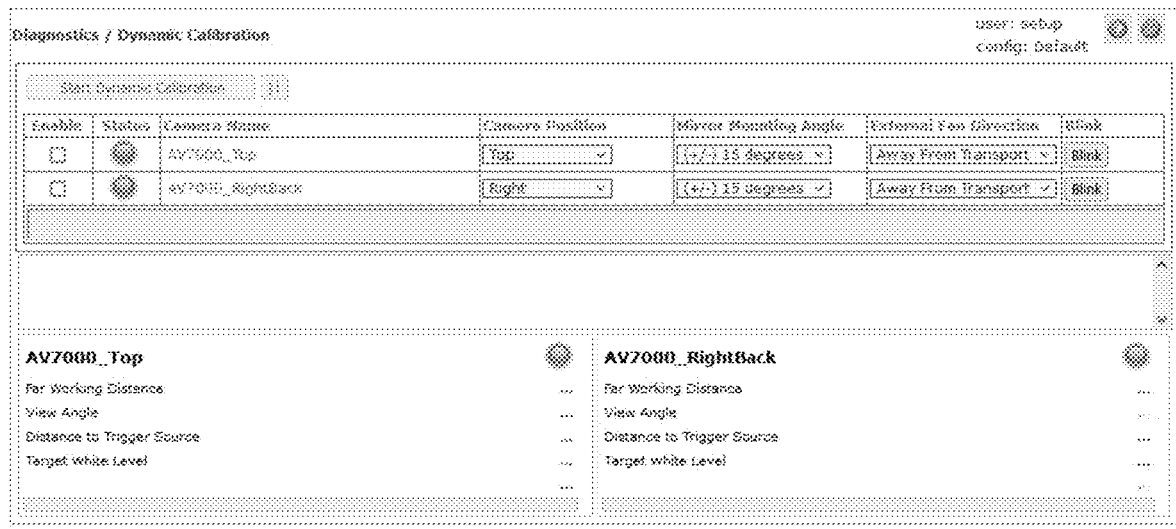
FIGS. 7 and 8 are examples of user interfaces generated by the system for receiving inputs needed to calibrate one or more cameras according to an embodiment of the disclosure.
Figure 8:
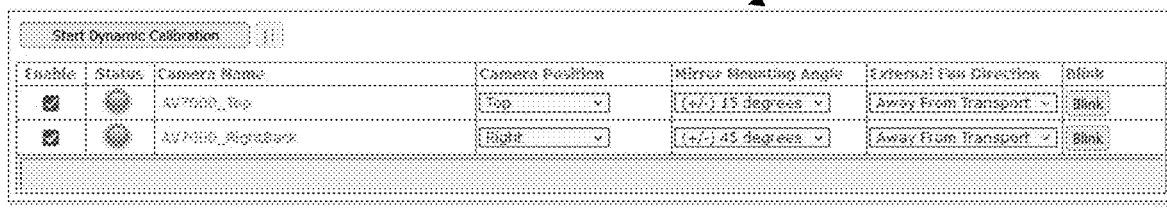
Figure 9:
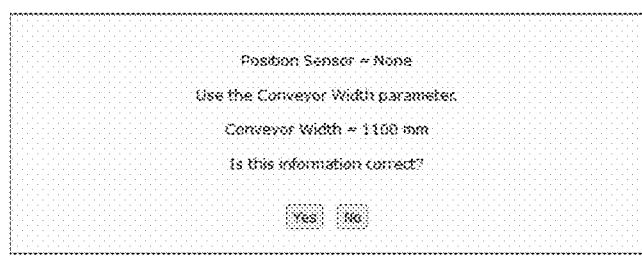
FIGS. 9-15 show various examples of user interfaces that show different situations or examples of default parameters that have been calculated and may be accepted by the user before continuing on to the calibration refinement process.

As an example, FIG. 7 is an example of a user interface 700 generated by the system for receiving inputs needed to calibrate one or more cameras according to an embodiment of the disclosure. In this case, two cameras (e.g., AV7000 Top and AV7000 RightBack) are selected for calibration as shown in the user interface 800 of FIG. 8. Inputs may be provided (e.g., drop down menus) indicating the camera position (e.g., top, right, left, bottom), an approximate mounting angle (e.g., ±15 degrees, ±30 degrees, ±45 degrees, or other predefined option), a mounting position (e.g., fan directed away from transport, fan directed toward transport), etc.

Figure 10:
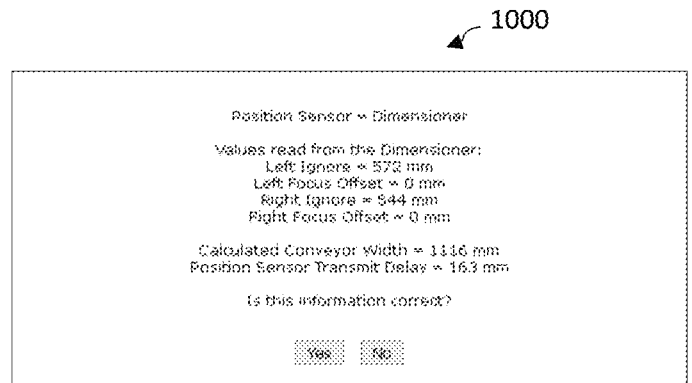
Figure 11:
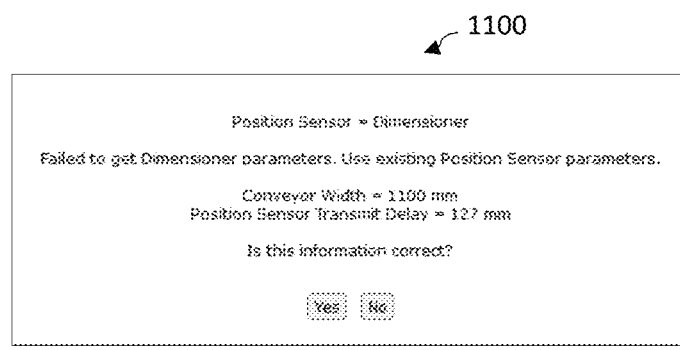
Figure 12:
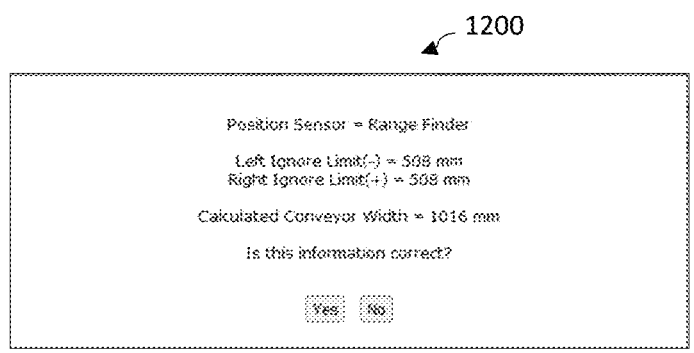
Figure 13:
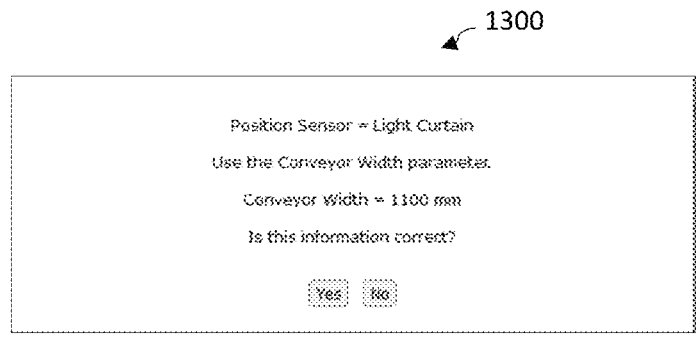
Figure 14:
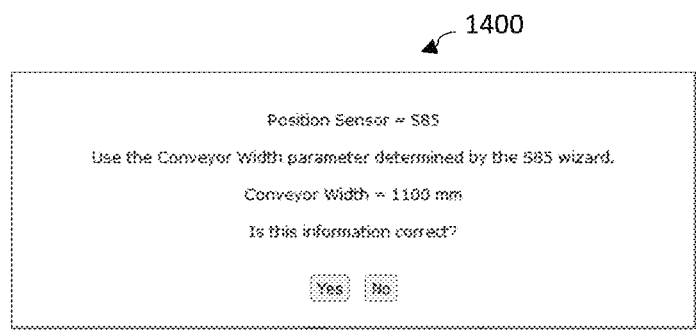
Figure 15:
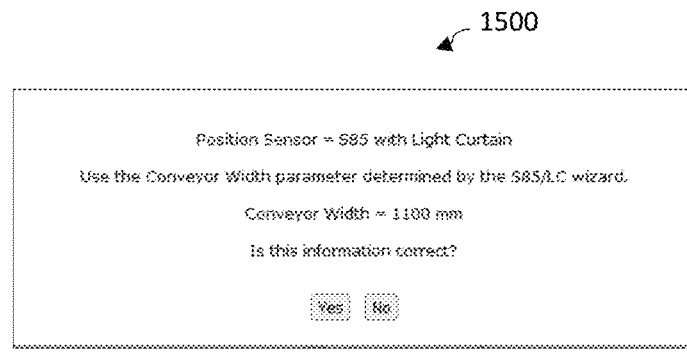

The user may initiate the start of calibration by hitting a start dynamic calibration button to generate the default calibration parameters which may then be written to each camera. FIGS. 9-15 show various examples of user interfaces 900-1500 that show different situations or examples of default parameters that have been calculated and may be accepted by the user before continuing to the calibration refinement process. For example, FIG. 9 describes a situation in which there is no position sensor as part of the system and a default conveyor width is used (e.g., 1100 mm). FIG. 10 describes a situation in which a dimensioner is used as a position sensor having a transmit delay (e.g., 163 mm), and which is used for calculating a conveyor width (e.g., 1116 mm). FIG. 11 describes a situation in which a dimensioner is used as a position sensor but where dimensioner parameters were not obtained. Instead, existing default parameters may be used for the transmit delay (e.g., 127 mm) and the conveyor width (e.g., 1100 mm). FIG. 12 describes a situation in which a range finder is used as a position sensor which is used for calculating a conveyor width (e.g., 1016 mm). These examples are given as non-limiting and other devices and parameters are also contemplated.

Calibration Refinement

Figure 16:
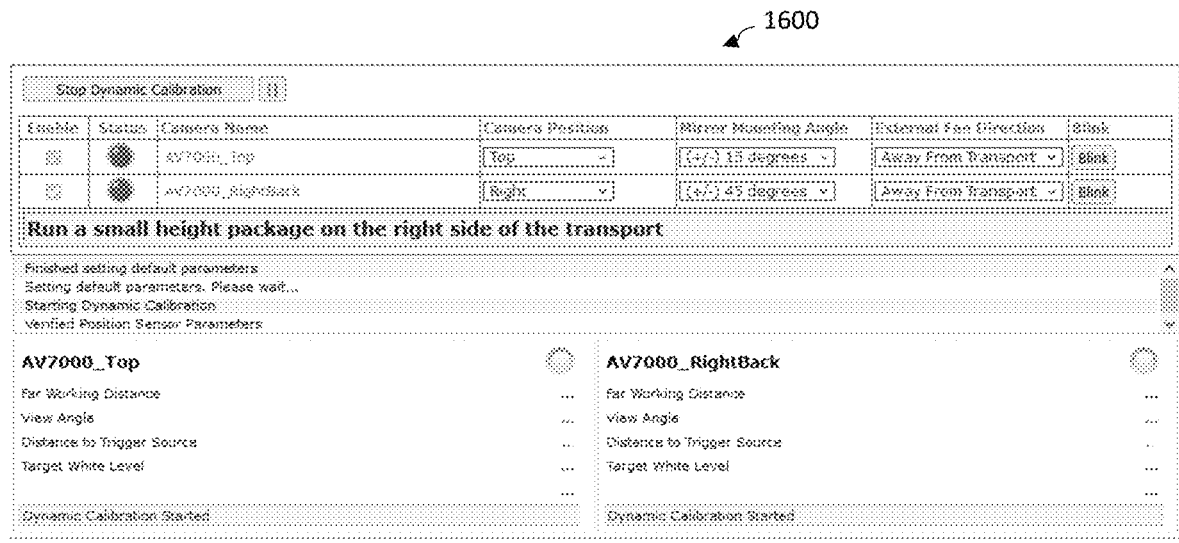
FIG. 16 shows a user interface showing the initiation of the calibration refinement process after the user has selected the dynamic calibration button.

FIG. 16 shows a user interface 1600 showing the initiation of the calibration refinement process after the user has selected the dynamic calibration button. For the calibration refinement process, a user may place different height packages at different locations on the transport mechanism. The packages may have calibration targets 410 (e.g., four per package) plated thereon an example of such is shown in FIG. 5. For example, a calibration target may be placed on each of the top, left, right, and bottom surfaces for each package used in calibration. Different numbers of calibration targets may be used depending on the cameras to be calibrated for a particular system. For example, the top calibration target may not be necessary if the top camera is not being calibrated. Likewise, the left, right, and/or bottom calibration target may not be necessary if the respective left, right, and/or bottom cameras are not being calibrated.

The purpose of the calibration refinement process is for each camera to view a package in the near and far of its working range. This is accomplished with at least two packages. For example, a first package may be a relatively small height package compared to a second package that is a relatively taller height. As an example, the first package may be placed on the right side of the transport mechanism, and the second package may be placed on the left side of the transport mechanism. In some embodiments, the "left side" and the "right side" of the transport mechanism may refer to being some partial amount of the package being left of center or right of center. Other embodiments may require the packages being fully left or right of center. These two packages may be used to set the initial angle, far working distance, and distance to scanline of each camera. This will allow each proceeding capture events to use dynamic focus and gain for fine tuning.

In addition to the default calibration parameters calculated during the calibration estimate process, each camera will be configured to enable fixed focus and fixed gain. Digital Zoom may be disabled to ensure the image dots per inch (DPI) is not modified. The focus height received from the position sensor may be used to set fixed focus and fixed gain.

Each camera may initiate a Capture Event for Package #1. The user may then be prompted to run the small height package on the right side of the transport. After the package is run, each camera will end its capture event. The captured image data is processed to find the calibration target for each package.

The following information is calculated when the calibration target is found in the image data:
  a. Calibration target corners (X=pixels, Y=lines)
  b. Calibration target corners are used to calculate the lines per inch (LPI) and DPI
  c. The DPI is used to calculate the distance from the camera to the calibration target (camera range)
  d. The LPI and "fixed distance from target to the leading edge of the package" are used to calculate the "image line at the leading edge of the package"
  e. The minimum and maximum Y image line values of the calibration target are used to find the tach count at the start and end of the target
  f. The "image line at the leading edge of the package" is used to find the tach count at the leading edge of the package
  g. The calibration target and surrounding barcodes are used to calculate the "energy" or edge sharpness
  h. The white areas around the calibration target are used to calculate the "average white level" of the target The captured log data may be used to calculate the following:
  a. Tach distance between the start and end of photo sensor.
  b. Tach distance between the start and end of position sensor.
  c. Tach distance from the start of photo sensor to the start of position sensor.
  d. Tach distance from the start of photo sensor to the leading edge of the package.
  e. The package position data is used to calculate package skew. The result is a left or right Y offset. Left or right is determined by the skew direction
  f. Focus height The following camera calibration parameters are set using the data collected above:
  a. "Photo sensor distance to position sensor" is calculated by converting the "tach distance from the start of photo sensor to the leading edge of the package" to millimeters.
  b. "Trailing edge photo sensor extend" is determined by subtracting the photo sensor length from the position sensor length. If the photo sensor length is smaller, that difference becomes a trailing edge photo sensor extend (offset).

Each camera may store the capture event results from Package #1 and set the global parameters "Photo sensor distance to position sensor" and "Trailing edge photo sensor extend."

Each camera may also start a capture event for Package #2. The user will be prompted to run the tall height package on the left side of the transport. After the package is run, each camera will end its capture event. The captured image data is processed to find the calibration target.

The following information may be calculated when the calibration target is found in the image data:
  a. Calibration target corners (X=pixels, Y=lines)
  b. Calibration target corners are used to calculate the LPI and DPI
  c. The DPI is used to calculate the distance from the camera to the calibration target (camera range)
  d. The LPI and "fixed distance from target to the leading edge of the package" are used to calculate the "image line at the leading edge of the package"
  e. The minimum and maximum Y image line values of the calibration target are used to find the tach count at the start and end of the target
  f. The "image line at the leading edge of the package" is used to find the tach count at the leading edge of the package
  g. The calibration target and surrounding barcodes are used to calculate the "energy" or edge sharpness
  h. The white areas around the calibration target are used to calculate the "average white level" of the target The captured log data is used to calculate the following:
  a. Tach distance between the start and end of photo sensor
  b. Tach distance between the start and end of position sensor
  c. Tach distance from the start of photo sensor to the start of position sensor
  d. Tach distance from the start of SRP to the leading edge of the package
  e. The package position data is used to calculate package skew. The result is a left or right Y offset. Left or right is determined by the skew direction
  f. Focus height The following camera calibration parameters are set using the data collected above:
  a. "Photo sensor distance to position sensor" is calculated by converting the "tach distance from the start of photo sensor to the leading edge of the package" to millimeters.

b. "Trailing edge photo sensor extend" is determined by subtracting the photo sensor length from the position sensor length. If the photo sensor length is smaller, that difference becomes a trailing edge photo sensor extend (offset).

Additional calibration parameters can be calculated now that each camera has been presented a package in the near and far of its working range. These additional calibration parameters may include:
  a. "Camera angle" is calculated using the difference in package height and the difference in "tach distance from the start of SRP to the leading edge of the package."
  b. "Camera far working distance" is calculated using the camera angle, package height, and the camera range calculated using the DPI of the calibration target.
  c. "Camera distance" to scanline is calculated using the camera angle, package height, and the "tach distance from the start of SRP to the leading edge of the package at the FWD"

Each camera will store the capture event results from Package #2. Enable dynamic focus and dynamic gain (if the camera is not a bottom read). The camera angle, far working distance, and distance to scanline may be saved to each camera.

Each proceeding set of two packages will used to fine tune the camera angle, far working distance, and distance to scanline. Calibration verification will also be performed to determine if the process is complete.

In some embodiments, additional packages may be used for further calibration refinement. Package #3 and Package #4 may be different heights and may be run through the calibration process as described above for Package #1 and Package #2 above. Each camera will use the angle, far working distance, and distance to scanline, set from the refinement from Packages #1 and #2 above, as the starting parameters to generate image valid. The start of image valid, embedded in the image data, and the "image line at the leading edge of the package" will be used to determine the accuracy of the calibration parameters.

The system may then measure the distance between the start of image valid and the "image line at the leading edge of the package" for the package run in the far or each camera's working range, and then measure the distance between the start of image valid and the "image line at the leading edge of the package" for the package run in the near or each camera's working range. A difference between these two measurements may be used to determine the accuracy of the calibration.

For each camera, the distance to scanline may be determined to be correct if the distance measured is within a pre-determined limit. The distance to scanline may need to be adjusted if the distance measured is greater than the pre-determined limit.

For each camera, the angle is determined to be correct if the measured difference is within a pre-determined limit. The angle will need to be adjusted if the measured difference between is greater than the pre-determined limit.

The far working distance may be calculated based on the angle and DPI of the target at the near and far of the working range.

Calibration refinements continue to be made until measured differences are within predetermined limits. Once calibration is complete, updated parameters will be written to each camera, and dynamic calibration will be stopped.

If an error occurs, the previous package will need to be re-run. Calibration can be paused by pressing the "Pause/Play Button". Press the "Pause/Play Button" again to resume calibration. The last calibration step and all data captured may be recalled if calibration is interrupted (e.g., browser connection is lost, or the user navigates to another page). All the values selected previously will be updated, along with any calibration values. A camera's starting parameters may be reloaded if calibration is stopped before calibration is complete.

Dynamic calibration error definitions may include one or more of the following:
  a. Failed to Find Checkerboard
    i. Possible causes:
      1. Side railing is blocking the cameras view of the target
      2. Checkerboard was not in the cameras view
      3. Checkboard is damaged
    ii. Possible Solutions:
      1. Try inducting the package a few inches from the left/right side of the transport
  b. Failed with Invalid Package Data
    i. No difference in height detected between the two packages inducted. For side cameras this would mean there was no left to right difference
  c. Failed with Invalid Target Rotation
    i. The calibration target rotation is not correct. Reference the picture above for target placement on a package
  d. Failed to Open Event Log
    i. The log used to record event data could not be opened. Try to re-run the last package
  e. Failed with Invalid Trigger Data
    i. Photo Sensor or Position Sensor data is missing. Check parameter settings and physical connections
  f. Failed with Too Much Package Skew
    i. Too much package skew detected. Re-run the package with less skew
  g. Failed with Missing Photo Sensor Data
    i. Photo Sensor data is expected but it was not received. Check your operating mode parameters
  h. Failed with Missing Position Sensor Data
    i. Position Sensor data is expected but it was not received. Check your operating mode parameters
  i. Failed with No Package Data Captured
    i. No data was received for the last package. Try to re-run the last package
  j. Failed with Package was Run Beyond the Left Conveyor Edge
    i. The last package was run too far to the left (beyond the left edge defined by the position sensor)
  k. Failed with Package was Run Beyond the Right Conveyor Edge
    i. The last package was run too far to the right (beyond the right edge defined by the position sensor)
  l. Failed with Invalid Package Height Difference less than X mm
    i. The difference in height was too small. The minimum difference in height is 203 mm. For side cameras this would mean there was not enough left to right difference
  m. Failed with Package Corner Could Not Be Found
    i. The package corner could not be found in the embedded data. Try to re-run the last package
  n. Failed with Too Much Package Height Variation
    i. The height data reported by the position sensor varies by more than 50 mm. Make sure the package being used is not damaged and does not vary in height. If the package is not the issue, check the position sensor.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A dynamic dimensioning system configured to scan one or more objects moving on a transport mechanism, the system comprising:
    at least one camera having a field-of-view directed toward the transport mechanism;
    a range finder operably coupled with the at least one camera over a communications network;
    a tachometer operably coupled with the at least one camera over the communications network, the tachometer configured to configured to output a signal representative of the movement of the transport mechanism; and
    a computer operably coupled to the communications network, and configured to perform a dynamic calibration operation comprising:
        a calibration estimate routine configured to generate default configuration parameters responsive to selections by a user from among a plurality of pre-defined user inputs via graphical user interface; and
        a calibration refinement routine configured to refine the default configuration parameters to generate a completed set of calibration parameters that are set for the at least one camera by performing calculations for:
            a refined camera angle for the at least one camera being calibrated;
            a refined far working distance for the at least one camera being calibrated; and
            a refined camera distance to a scanline for the at least one camera being calibrated.

2. The system of claim 1, wherein the transport mechanism includes one of a conveyor belt, a cross belt sorter, or a tilt tray.

3. The system of claim 1, wherein the at least one camera includes a plurality of cameras operably coupled to the communications network, and wherein the communications network is a synchronization network for an inter-camera network with distributed tachometer count signals among the plurality of cameras.

4. The system of claim 3, further comprising a photo sensor configured to provide an active high signal or an active low signal to indicate the is present on the transport mechanism.

5. The system of claim 4, wherein the tachometer is configured to generate a tach stamp that is multicast to the plurality of cameras on the sync network when the photo sensor transitions from blocked to unblocked or when the photo sensor transitions from unblocked to blocked.

6. The system of claim 3, further comprising a position sensor configured to provide an object position information at a predefined time interval.

7. The system of claim 6, wherein the tachometer is configured to generate a tach stamp that is multicast to the plurality of cameras on the sync network with the object position information provided by the position sensor.

8. The system of claim 1, wherein the range finder includes at least one of a time-of-flight sensor, a dimensioner, a light curtain, or a combination thereof.

9. The system of claim 1, wherein the plurality of pre-defined user inputs include at least one of:
an approximate mounting angle selected from among a plurality of different pre-defined mounting angle options;
a mounting position selected from among a plurality of different pre-defined mounting position options; and
a maximum package height selected from among a plurality of different pre-defined package height options.

10. The system of claim 9, wherein the default configuration parameters include a working transport width received by extracting the working transport width from a position sensor or receiving the working transport width through an input to the user interface from the user.

11. The system of claim 10, wherein the default configuration parameters include a default far working distance needed to cover the required field-of-view.

12. The system of claim 11, wherein the default far working distance is calculated using a maximum package height, the working transport width, a mounting position and approximate mounting angle for the at least one camera being calibrated.

13. The system of claim 1, wherein the dynamic calibration operation is performed without first performing any static calibration operation.

14. A method for dynamically configuring one or more industrial line camera with a calibration target on a transport mechanism, the method comprising:
arranging at least one camera having a field-of-view directed toward the transport mechanism; and
performing, via a computer, a dynamic calibration operation without first performing any static calibration operation, the dynamic calibration operation comprising:
generating default configuration parameters via a calibration estimate routine responsive to selections by a user from among a plurality of pre-defined user inputs via graphical user interface;
refining the default configuration parameters to generate a completed set of calibration parameters via a calibration refinement routine including:
calculating a refined camera angle for the at least one camera being calibrated;
calculating a refined far working distance for the at least one camera being calibrated; and
calculating a refined camera distance to a scanline for the at least one camera being calibrated; and
applying the refined configuration parameters to the at least one camera for subsequent operation.

15. The method of claim 14, wherein performing the dynamic calibration operation includes operation simultaneously calibrating all cameras of plurality of cameras operatively coupled over a network of a system.

16. The method of claim 15, further comprising the user selecting different pre-defined user inputs via the graphical user interface for each camera of the plurality of cameras that is being calibrated simultaneously.

17. The method of claim 14, further comprising:
transporting, via the transport mechanism, a first package and a second package during the calibration refinement routine, the first package and the second package having different heights; and
capturing, via the one or more cameras, images and information used during the calibration refinement routine as the first package and the second package move along the transport mechanism to generate the completed set of calibration parameters.

18. The method of claim 17, wherein calculating the refined camera angle is based, at least in part, on a difference in package height and a difference in a tach distance from a system reference point (SRP) to a leading edge for the first package and the second package when moving on the transport mechanism through the field-of-view of the at least one camera being calibrated.

19. The method of claim 18, wherein calculating the refined far working distance is based, at least in part, one the refined camera angle, package height, and a camera range calculated using a dots per inch calculation for the first or second packages in images captured by the at least one camera being calibrated.

20. The method of claim 19, wherein calculating the refined camera distance to the scanline is based, at least in part, on the refined camera angle, package height, and a tach distance from the SRP to a leading edge for the first or second packages at the refined far working distance.

* * * * *